(12) United States Patent
McClelland

(10) Patent No.: US 8,940,079 B2
(45) Date of Patent: Jan. 27, 2015

(54) GAS SCRUBBER APPARATUS AND METHOD

(75) Inventor: Kenneth James McClelland, West Vancouver (CA)

(73) Assignee: Pacific Green Technologies Inc., San Jose, CA (US)

( * ) Notice: Subject to any disclaimer, the term of this patent is extended or adjusted under 35 U.S.C. 154(b) by 424 days.

(21) Appl. No.: 13/380,449

(22) PCT Filed: Jun. 25, 2010

(86) PCT No.: PCT/CA2010/000988
§ 371 (c)(1),
(2), (4) Date: Dec. 22, 2011

(87) PCT Pub. No.: WO2010/148513
PCT Pub. Date: Dec. 29, 2010

(65) Prior Publication Data
US 2012/0097031 A1    Apr. 26, 2012

Related U.S. Application Data

(60) Provisional application No. 61/220,352, filed on Jun. 25, 2009.

(51) Int. Cl.
| | | |
|---|---|---|
| *B01D 19/00* | (2006.01) | |
| *B01D 46/00* | (2006.01) | |
| *B01D 51/00* | (2006.01) | |
| *B01D 53/14* | (2006.01) | |
| *B01D 47/00* | (2006.01) | |
| *B01D 53/18* | (2006.01) | |
| *B01D 47/06* | (2006.01) | |
| *B01D 53/34* | (2006.01) | |
| *B01D 47/02* | (2006.01) | |

(52) U.S. Cl.
CPC ............... *B01D 53/18* (2013.01); *B01D 47/06* (2013.01); *B01D 53/34* (2013.01); *B01D 47/028* (2013.01); *B01D 2247/04* (2013.01); *B01D 2257/302* (2013.01); *B01D 2257/404* (2013.01); *B01D 2257/504* (2013.01); *B01D 2257/90* (2013.01); *B01D 2258/012* (2013.01)
USPC ............ 95/213; 951/186; 951/210; 951/226; 951/242; 96/273; 96/297; 96/300

(58) Field of Classification Search
CPC ....................................................... B01D 53/18
USPC ........... 96/273, 297, 200, 345, 354, 179, 262; 95/210, 213, 226, 157, 186, 242; 261/115

See application file for complete search history.

(56) References Cited

U.S. PATENT DOCUMENTS 3,739,555 A * 6/1973 Liebig .............................. 96/300

* cited by examiner

*Primary Examiner* — Robert Clemente
*Assistant Examiner* — Joubert X Glover
(74) *Attorney, Agent, or Firm* — Island IP Law; Stephen R. Burri

(57) ABSTRACT

A scrubber for removing contaminants from a gas stream, comprising a tank, a submerged head extending horizontally, wherein the submerged head comprises a plate having slots extending throughout, four solid joined vertical walls inset from the walls of the tank below the plate to form an open ended box under the plate, and openings along each edge of the plate between the walls of the tank and the vertical walls of the submerged head; a first baffle above the submerged head and means for spraying scrubbing fluid. The scrubber may comprise a flooded head extending horizontally above the first baffle and head having narrow slots extending throughout; and a second baffle extending horizontally between the four walls of the tank.

16 Claims, 10 Drawing Sheets

GAS SCRUBBER APPARATUS AND METHOD

FIELD OF THE INVENTION

The present invention relates to air emissions, and particularly relates to an apparatus for scrubbing contaminants from gases.

BACKGROUND OF THE INVENTION

The need for immediate action to protect the environment is a value that is universal throughout the global community. The pollution of our air and water is affecting our health, food supplies and is a contributing factor to global climate change. The demand for effective devices to remove harmful pollutants from combustion exhaust gases, manufacturing processes and animal waste is higher than at any time in our history.

The installation of devices to remove particulate matter, noxious gasses, acidic compounds and offensive odors (collectively, "contaminants") emanating from all types of manufacturing, industrial and commercial processes is now an accepted part of industrial manufacturing. Tougher environmental legislation is the primary driver behind the increasing demand for remedial devices and provides the incentive for rapid development of more effective tools to clean flue gases and effluent discharges from manufacturing and power generation plants, vehicles and heavy equipment. These devices use different processes to isolate or change the form of the polluting components in order to remove them from the waste or exhaust discharge. These processes may utilize chemical sprays, catalytic reactants, electric fields, filters, cyclones and chemical solutions to remove pollutants from the waste stream.

The combustion of hydrocarbons in the form of coal, fuel oil, gasoline and diesel fuel is an essential part of modern life. Coal is used to fuel furnaces to generate heat and power to service residential and industrial facilities around the world. Diesel fuel powers our transportation industry, the heavy equipment used in mining, forestry, farming and materials handling, an increasing number of vehicles, locomotives, ships and port service vessels. The prevalence of these combustion processes creates a significant contribution to atmospheric pollution.

In addition to combustion processes, the emission of toxic or odorous chemical compounds from manufacturing processes for products such as paints and stains, chemicals, paper and plastics has a detrimental impact on our environment. Chemical fallout in the form of acid rain contaminates waterways and destroys fish and wildlife habitats. Odors from manufacturing operations and large scale animal farms create an offensive environment for human occupation.

Development of the invention was undertaken to provide industry with a device that would economically and effectively meet the increasingly restrictive air quality standards. The scope of the design addressed a range of polluting gas streams from both combustion and non-combustion sources. It was recognized that the design needed to have flexibility to meet the challenges of different industries and physical layout restraints, expandability to meet the gas processing volumes generated by a range of industrial operations and it needed to be efficient in its energy consumption and pollutant removal while maintaining a price point that was acceptable to international industry. Providing a device to industry that meets these criteria will provide global environmental benefits.

SUMMARY OF THE INVENTION

According to one embodiment of the present invention, there is provided a scrubber apparatus for removing contaminants from a gas stream, comprising a tank having a ceiling, a floor, a gas inlet, a gas outlet, a scrubbing fluid inlet at an upper end, and a scrubbing fluid outlet in the floor; a submerged head extending horizontally between the four walls of the tank above the scrubbing fluid outlet and below the gas outlet, wherein the submerged head comprises a plate having a plurality of narrow slots extending throughout, four solid joined vertical walls inset from the walls of the tank and extending below the plate to form an open ended box under the plate, and a row of scrubbing fluid openings along each edge of the plate between the walls of the tank and the vertical walls of the submerged head; a first baffle extending horizontally between the four walls of the tank and disposed above the submerged head and below the gas outlet; and one or more spray means for spraying scrubbing fluid from an upper end of the tank.

The scrubber apparatus may further comprise a first flooded head extending horizontally between the four walls of the tank above the first baffle and below the gas outlet, wherein the flooded head comprises a plate having a plurality of narrow slots extending throughout; and a second baffle extending horizontally between the four walls of the tank and disposed above the first flooded head and below the gas outlet. The scrubber apparatus may also comprise a second flooded head extending horizontally between the four walls of the tank above the second baffle and below the gas outlet; and a third baffle extending horizontally between the four walls of the tank and disposed above the second flooded head and below the gas outlet.

The gas inlet may be located at the top end of the tank and a gas inlet duct conducts the gas to a position below the submerged head. The gas inlet may be located at the side of the tank and a gas inlet duct conducts the gas to a position below the submerged head. The gas inlet is located below the submerged head of the tank.

There may be an access door in one or more walls of the tank, and a mist eliminator having four vertical walls forming a hollow vertical column contiguous with the tank, wherein the mist eliminator comprises an absorbent mesh extending between the four walls of the mist eliminator. The flooded head may further comprise an overflow pipe disposed through the plate of the flooded head. The spray means may comprise one or more spray nozzles positioned near the ceiling of the tank. The slots of the submerged head may be cut at an angle of between 20 and 40 degrees, preferably 30 degrees, from vertical. The slots of the flooded head may be cut at an angle of between 20 and 40 degrees, preferably 30 degrees, from vertical.

The spray means may comprise one or more spray nozzles positioned near the ceiling of the tank. The size of the slots in the submerged head may be selected to prevent passage therethrough of scrubbing fluid in the presence of gas below the submerged head unless the level of scrubbing fluid exceeds a selected height above the submerged head. The size of the slots in the flooded head may be selected to prevent passage therethrough of scrubbing fluid in the presence of gas below the flooded head unless the level of scrubbing fluid exceeds a selected height above the flooded head.

According to one of its aspects, the present invention may comprise the use of the apparatus described herein to remove contaminants from a gas stream.

According to another one of its aspects, the present invention may comprise a method of removing contaminants from a gas stream, the method comprising introducing a scrubbing fluid into the apparatus described herein to a desired fluid level; cooling a contaminated process gas using a prior art gas conditioner; introducing the cooled contaminated gas into the apparatus described herein at a position below the submerged head; allowing the gas to pass upwardly through the submerged and flooded heads and one or more baffles to transfer contaminants from the gas into the scrubbing fluid; spraying the exiting gas to remove additional contaminants and slow the gas flow velocity; allowing the exiting gas to exit the scrubbing apparatus; draining scrubbing fluid from the bottom of the tank to maintain a desired scrubbing fluid level; and cleaning drained scrubbing fluid for reuse in the scrubbing apparatus.

According to yet another one of its aspects, the present invention may comprise a plant assembly for processing contaminated gas streams, comprising the scrubbing apparatus described herein. According to a further one of its aspects, the present invention may comprise the use of the apparatus described herein to remove from a gas stream one or more contaminants selected from the group of contaminants comprising nitrous oxide, nitric oxide, carbon dioxide, and sulphur dioxide.

BRIEF DESCRIPTION OF THE DRAWINGS

A detailed description of the preferred embodiments is provided below by way of example only and with reference to the following drawings, in which.

Figure 1:
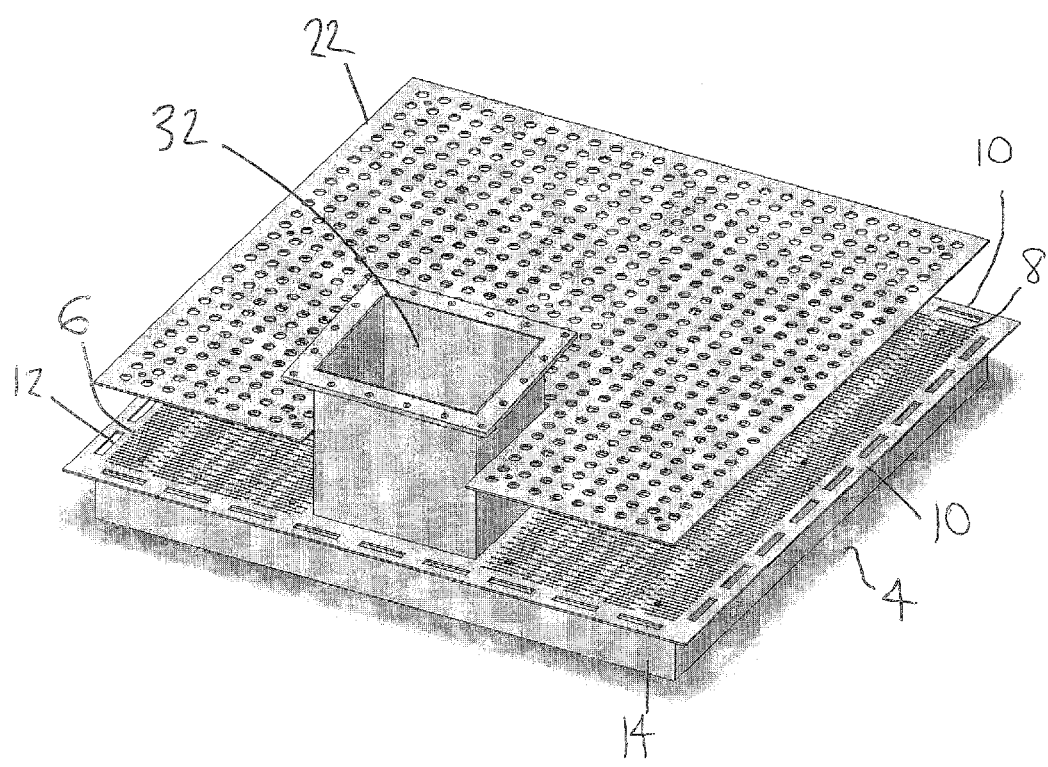
FIG. 1 is a perspective view of a flooded head, according to one embodiment of the present invention.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

The scrubber of the present invention is designed to be efficient, flexible and expandable. It may be differentiated from other wet scrubbers by its approach to the presentation of the gases to be scrubbed and its unique scrubber head. The gases to be scrubbed may be from a wide range of sources including combustion exhaust gases from diesel engines and coal-fired furnaces, process gases from plants manufacturing such products as chemicals, pulp and paper and coatings, and biomass greenhouses.

The invention may be categorized as a wet scrubber as it utilizes a scrubbing fluid contained in a tank. The composition of the scrubbing fluid is selected on the basis of the chemical composition of the gas to be scrubbed and the pollutants or odors to be removed from the gas. The size and shape of the tank may be selected to optimize scrubbing based on the volume of gas to be scrubbed and the configuration of the physical space available for installation of the scrubber. One or more scrubbing heads may be positioned within the scrubbing fluid within the tank. The gas to be scrubbed is directed to a volume below the lowermost portion of the lowest scrubbing head.

The invention allows the scrubber heads and surrounding tank to be round, square, rectangular, or other shape, as dictated by the space available for its installation. Square and rectangular shapes may be preferred to optimize the ratio of scrubber gas volume processing capacity to tank footprint area.

The horizontal area of each scrubber head may vary depending on the size of the tank, and whether scrubbing is achieved in a single tank or multiple tanks. The expandability of the scrubber head allows the invention to be scaled up for use in the largest industrial application.

The gas presented to the scrubber is commonly from a combustion process with temperatures approaching as much as 600° C. As such, the gas to be scrubbed must be cooled to a maximum temperature of 80° C. and preferably 50° C. using heat exchangers of various prior art designs prior to the introduction of the gas to the invention. The gas may be introduced dry or may be mixed with a cooling fluid.

The scrubber of the present invention incorporates one or more horizontal scrubbing heads that are linearly expandable, most commonly in a rectangular shape. The gas to be scrubbed may be introduced from the top of the scrubber, from any side via one or more inlet ports, or from the bottom of the scrubber.

Figure 2:
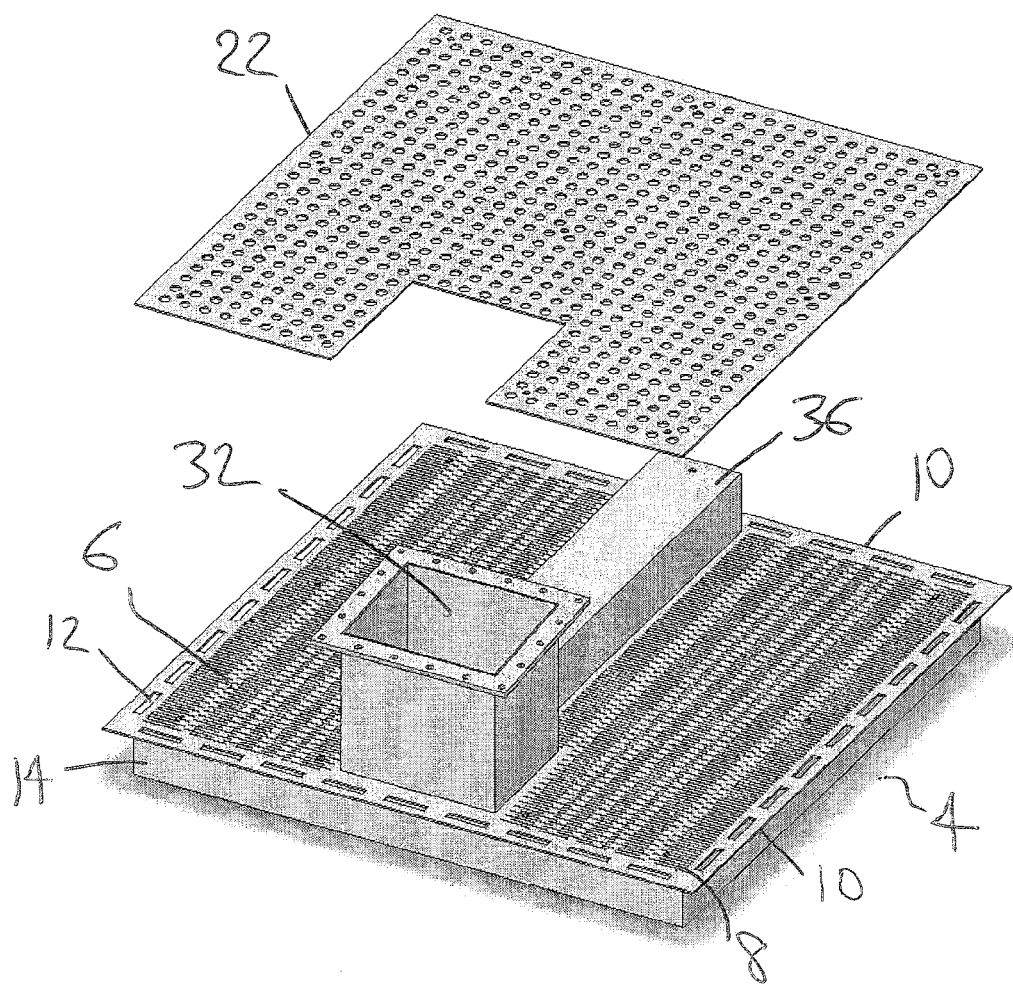
FIG. 2 is a blow up view of a flooded head, according to one embodiment of the present invention.

In a preferred embodiment, the scrubber 2 of the present invention may incorporate two distinctive scrubber heads. One of the scrubber heads, as depicted in FIGS. 1 and 2, is designated a submerged head 4. This head comprises a generally planar, rectangular plate 6 having a plurality of narrow slots 8 disposed therethrough for the passage through the head of gases. Along each edge 10 of the rectangular plate there is disposed a row of larger openings 12 for the flow of scrubbing fluid. A solid vertical wall 14 extends downwardly from the plate parallel to each edge, and set back from the plate edge to a position internal to the row of openings along the plate edge. The ends of each vertical wall join two adjacent vertical walls to form a box having an open bottom end and a top end formed by the slotted plate. The submerged head is the lowermost head in the scrubber assembly, and the plate extends to the walls of the scrubber tank. The horizontal shape of the scrubber head may vary, but rectangular is a preferred embodiment.

Figure 3:
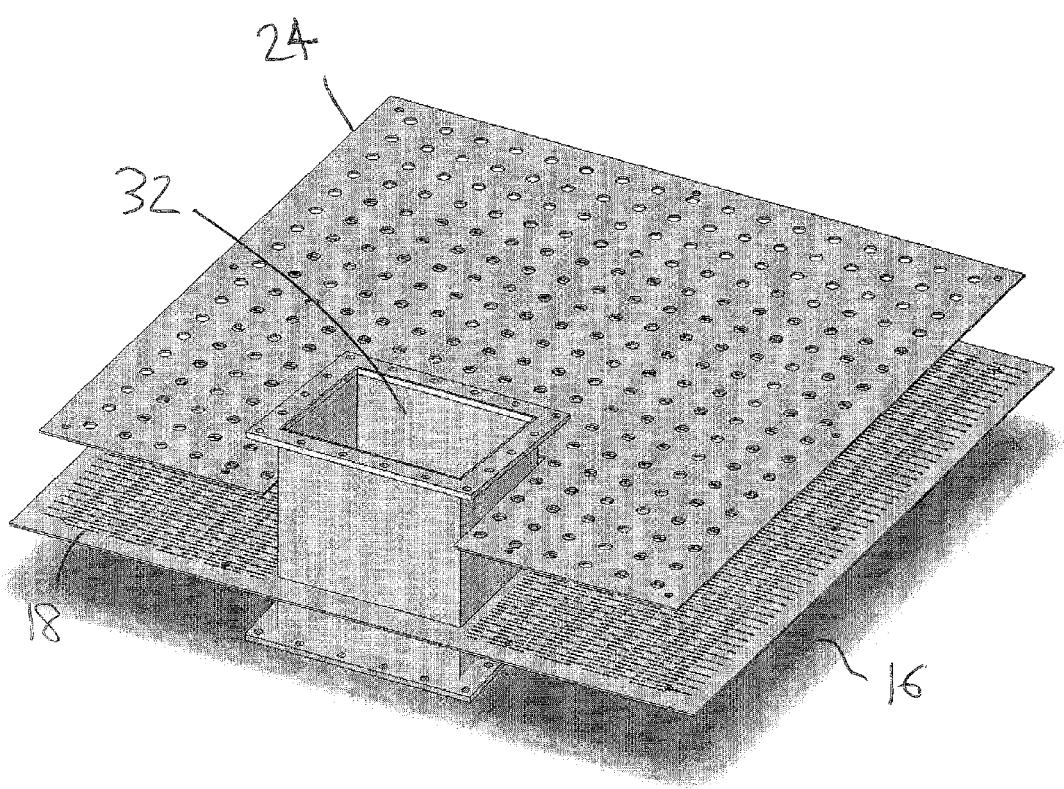
FIG. 3 is a perspective view of a submerged head, according to one embodiment of the present invention.
Figure 4:
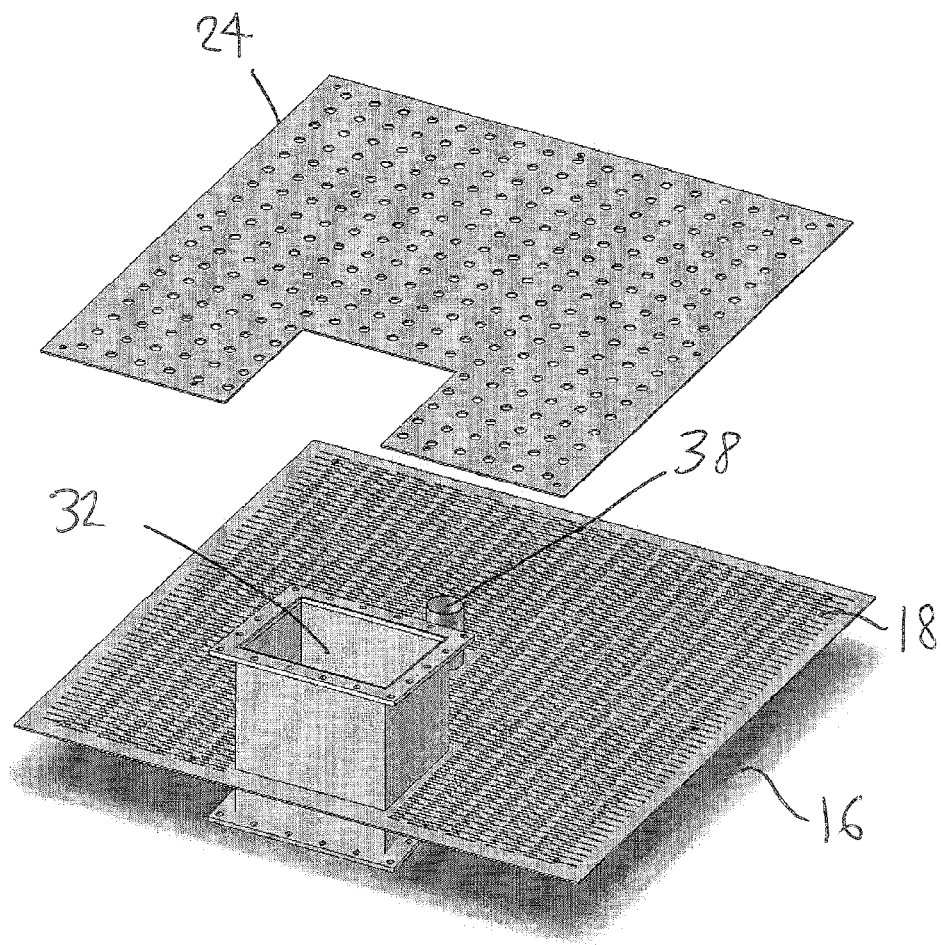
FIG. 4 is a blow up view of a submerged head, according to one embodiment of the present invention.
Figure 5:
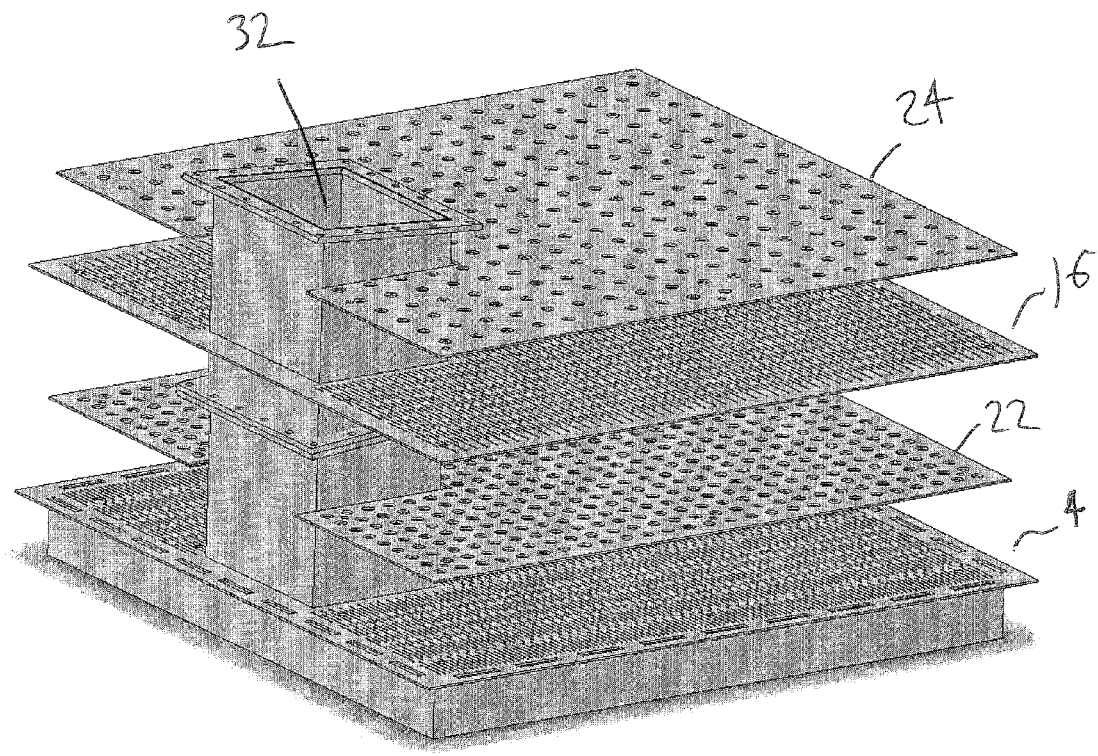
FIG. 5 is a perspective view of an assembly of a flooded head and a submerged head, according to one embodiment of the present invention.
Figure 6:
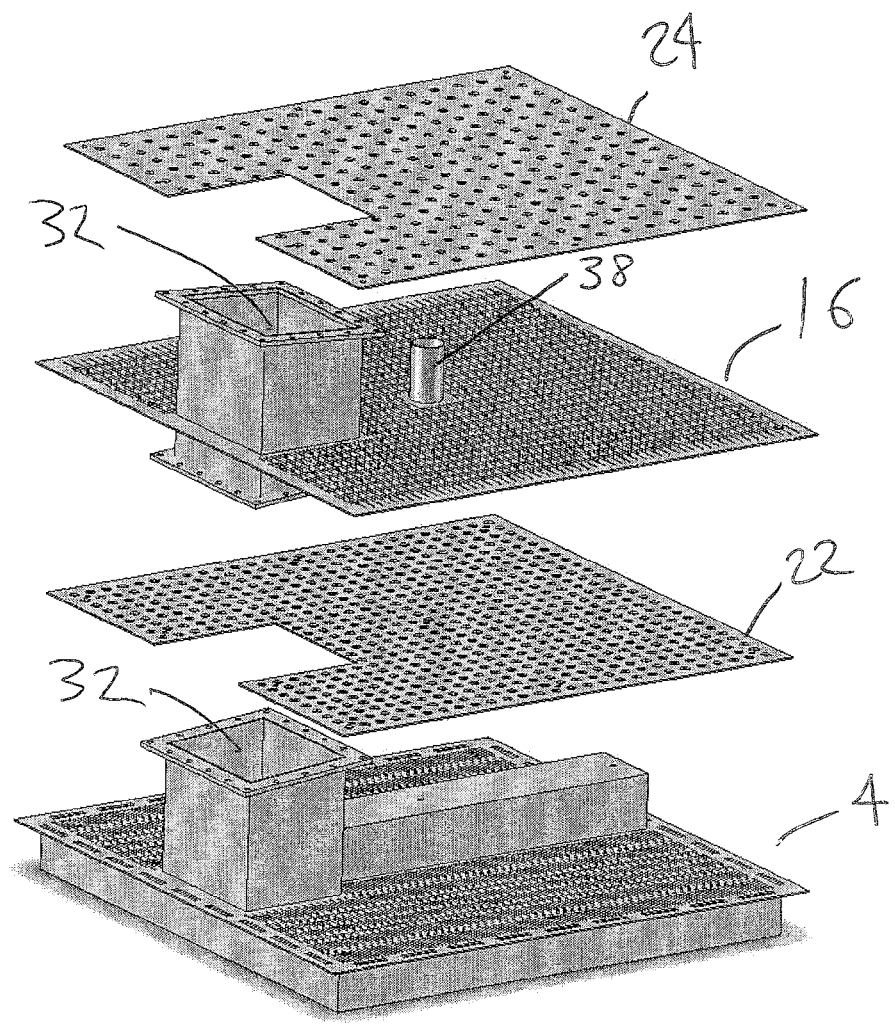
FIG. 6 is a blow up view of an assembly of a flooded head and a submerged head, according to one embodiment of the present invention.

The other style of scrubber head is designated a flooded head 16, as depicted in FIGS. 3 and 4. The flooded head has slots 18 for the passage therethrough of gas, but lacks the rows of larger openings along each edge of the plate. There are no vertical walls extending below the plate. One or more flooded heads may be placed above a submerged head in the scrubber assembly, as shown in FIGS. 5 and 6.

Figure 7:
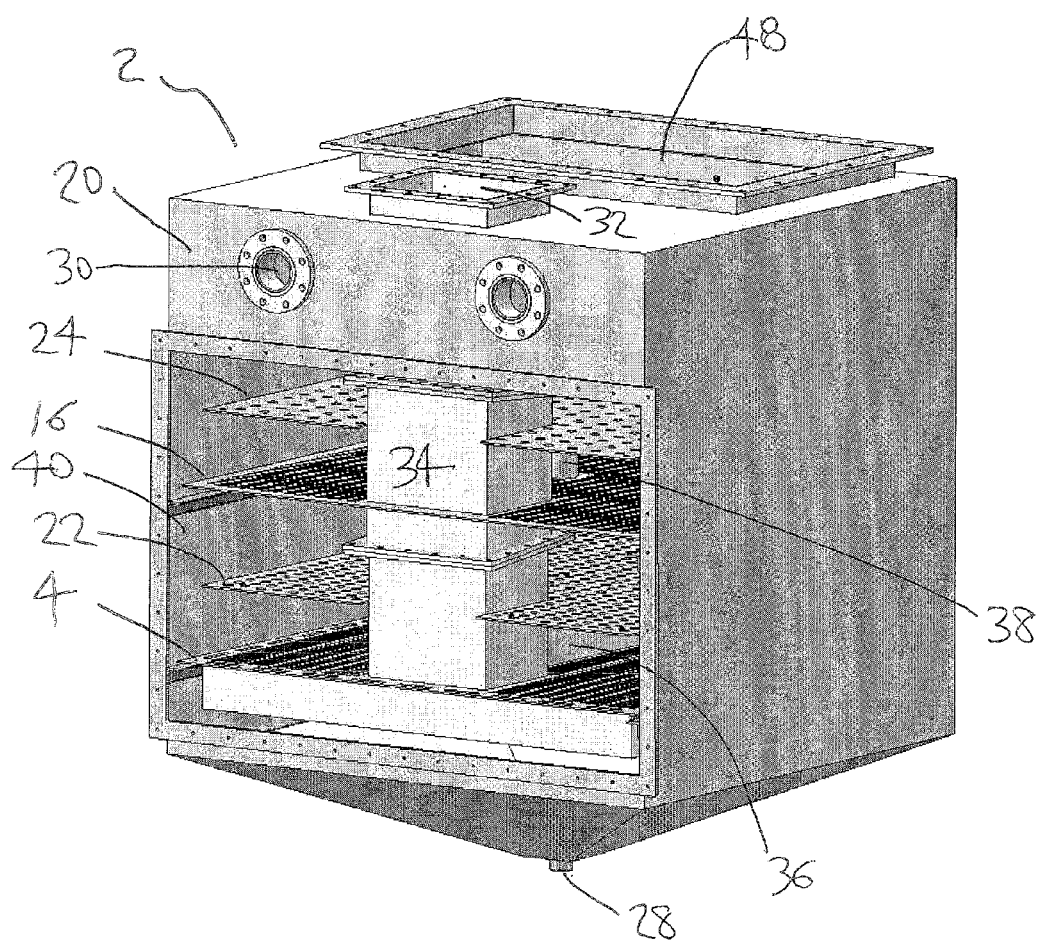
FIG. 7 is a perspective view of the scrubber, according to one embodiment of the present invention.
Figure 8:
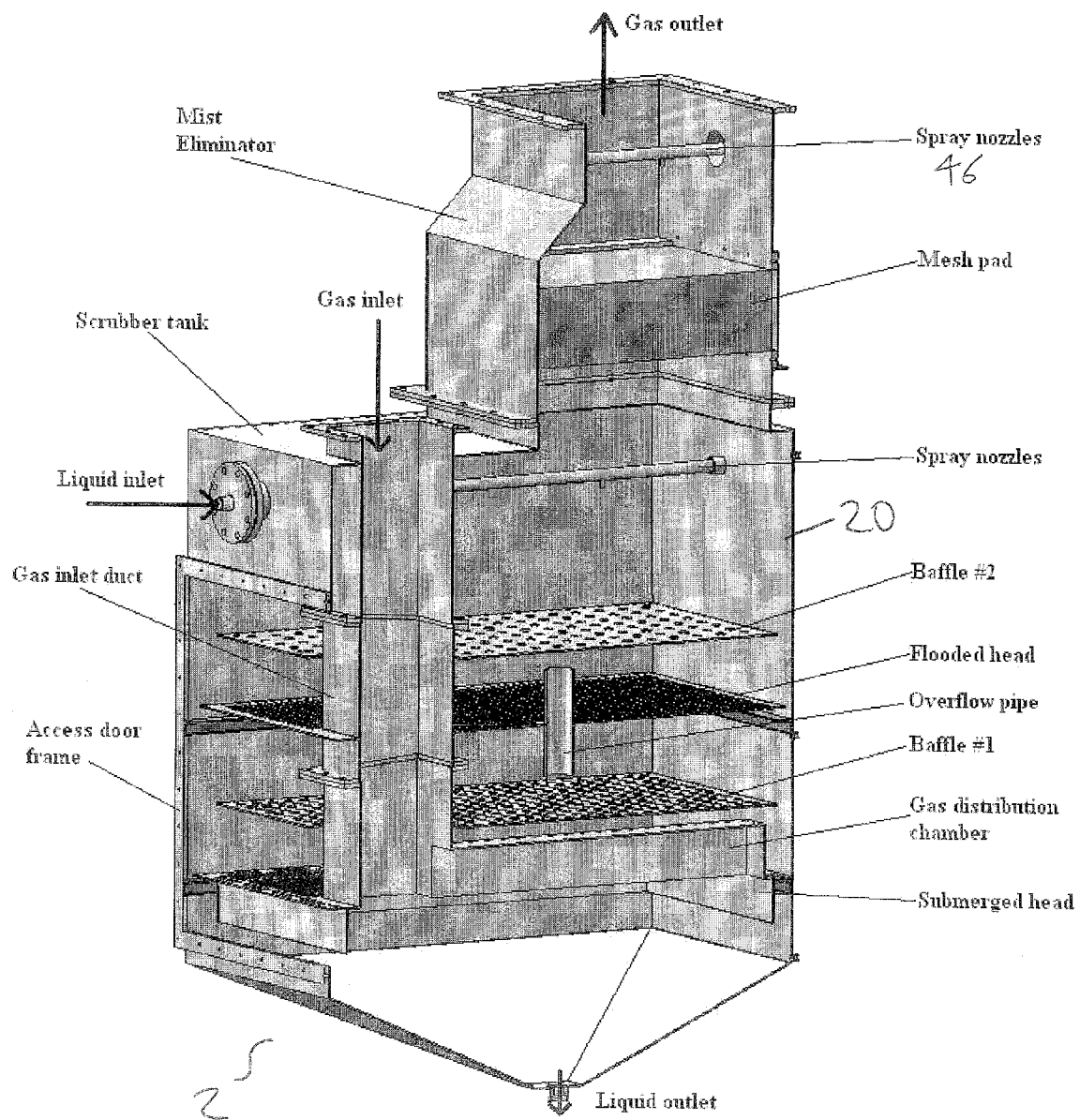
FIG. 8 is a cutaway view of the scrubber, according to one embodiment of the present invention.

As depicted in FIGS. 7 and 8, one embodiment of the scrubber assembly of the present invention comprises a tank 20 having disposed therein a submerged head 4 extending horizontally across the tank. The tank is constructed in a manner capable of holding scrubbing fluid without leaks or structural failure. Above the submerged head there is disposed a first baffle 22 extending horizontally across the scrubber tank. Above the first baffle is disposed a flooded head 16 extending horizontally across the scrubber tank. A second baffle 24 is disposed above the flooded head, extending horizontally across the scrubber tank. Above the second baffle and in proximity to the ceiling of the scrubber tank, there is provided one or more spray nozzles 26. The lower end of the scrubber tank is preferably tapered to direct scrubbing fluid towards a liquid outlet 28. A liquid inlet 30 is provided near the top of the scrubber tank. In the embodiment shown in FIGS. 7 and 8, a gas inlet 32 is positioned at the top of the scrubber tank and a gas inlet duct 34 extends vertically through the tank to a gas distribution chamber 36 extending medially along the submerged head. An overflow pipe 38 is disposed through the flooded head 16 to allow drainage of scrubbing fluid from above the flooded head to the lower portion of the tank.

An access door 40 is provided along one side of the scrubber tank to allow access to the heads and inside of the tank. A mist eliminator 42 may be disposed above the scrubber tank to receive the moist gas leaving the scrubber. A mesh pad 44 extends across the mist eliminator volume to absorb moisture from the exiting gas. Supplementary spray nozzles 46 may be disposed within the mist eliminator in proximity to the gas outlet 48 at the top of the apparatus.

Figure 9:
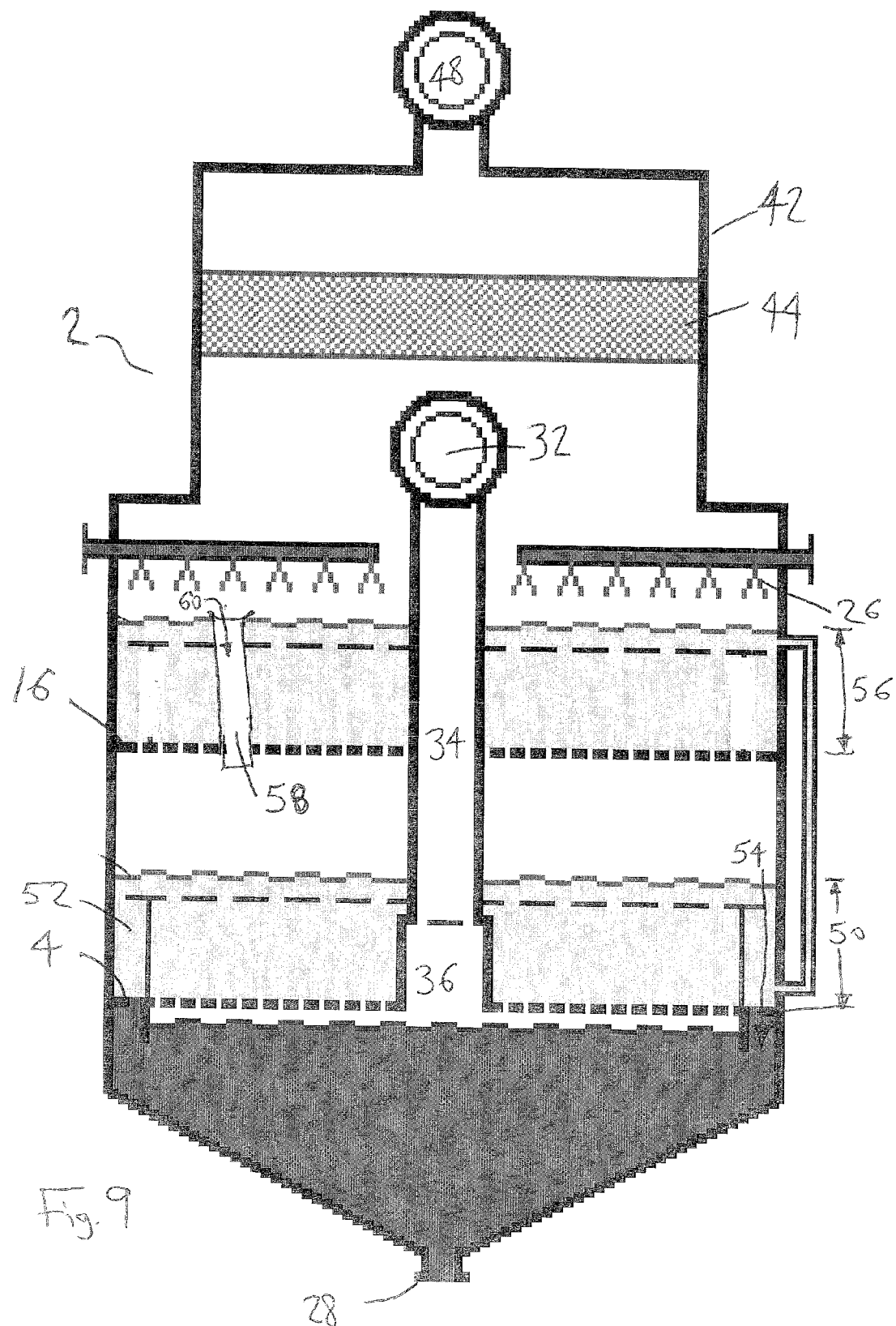
FIG. 9 is a cross-sectional view of a scrubber, according to one embodiment of the invention.

As shown in FIG. 9, the horizontal orientation of the invention's scrubber heads creates a fixed depth 50 of scrubbing fluid 52 above the submerged head 4. This creates a constant backpressure caused by fluid depth above the scrubber head, regardless of the volume of gas being processed. Further, the horizontal orientation of the scrubber head design makes 100% of the scrubber head's slot area available at all times. For the submerged head, the scrubbing fluid is maintained at a level to create a fixed depth of scrubbing fluid above the head. While the narrow slots of the head do not permit the scrubbing fluid to drain through the central area of the submerged head due to the upward pressure of the gas being scrubbed, excess scrubbing fluid is able to pass through the larger openings along the edges of the submerged head as indicated 54 to maintain the desired scrubbing fluid level. For the flooded head 16, the scrubbing fluid is unable to pass through the slots of the flooded head, so the fluid will accumulate to a level 56 determined by the upper end of the overflow pipe 58. Fluid above the top end of the overflow pipe will drain into the lower portion of the scrubber tank as indicated 60. In this manner, a generally constant level of scrubbing fluid is maintained above the flooded head.

When side inlet gas entry into the scrubber is used, the absence of an incoming gas pipe, hardware and mounting area makes the entire area above the scrubber heads free of any restrictions to maximize the exposed scrubber head slot area. Maximization of the area available for scrubbing slots serves to minimize the overall dimensions of the scrubber. This reduces the invention's overall size and increases its installation potential in confined areas.

The orientation of the scrubber head's slots provides an unobstructed vertical path for the bubbles formed by the slots in the scrubber head. The width, plurality and orientation of the scrubber heads' slots create the largest number of small bubbles possible. The interaction of the gas and the fluid is turbulent to achieve thorough mechanical and chemical interaction of the two mediums. The invention permits the bubbles emanating from the slots in the scrubber head to fill the entire area of the scrubber tank. This reduces the velocity of the exiting gases and creates general overall turbulence as the scrubbed gas exits the scrubbing fluid and enters the freeboard area of the scrubber tank. The lower velocity maximizes the duration of contact between the gas and scrubbing liquid. In addition, the lower level of turbulence of the scrubbing fluid's surface due to the lower velocity of the exiting gas is preferable to the high turbulence spikes created by alternative approaches.

One or more drains 62 are fixed in the bottom of the tank. One or more inlets are located in the top, bottom or sidewall of the tank. The inlets allow the gas to be scrubbed to enter the tank. Ducts are located at each inlet to conduct the gas to the scrubber head.

The tank contains one or more outlets at its top to collect the gas flow prior to exiting the tank. The heads have a minimum separation of 125mm. A flat top is preferred at the lowest level of the scrubbing. The upper heads may have vertical relief in of any configuration. The top of the head may contain multiple slots with a preferred width being in the range of 60 thousandths of an inch. The slots may be in any pattern with straight slots being preferred. The vertical cut of the slots may be perpendicular or at an angle to the plane of the top plate with an angled cut being preferred. The number of slots and the resulting slot area and size of the scrubbing head is selected by the volume of gas to be scrubbed and the shape of the space available for the scrubber. In order to deliver larger volumes of gas the head may contain multiple inlets at regular intervals along the length of the scrubbing head.

One or more baffles within the scrubbing tank serve as turbulence diffusers. The baffles consist of a plate with a plurality of openings disposed therethrough which permits the vertical movement of scrubbing fluid while reducing the horizontal influence of the scrubbing fluid.

A plurality of spray nozzles is located in the upper end of the tank. The nozzles direct a spray of scrubbing fluid down toward the turbulent zone above the uppermost head. Demisting devices in the form of vanes or screens (not shown) may be located above the spray nozzles in the uppermost region of the tank The gases to be scrubbed by the scrubber of the invention are typically exhausted from the engine or furnace at high temperatures. Therefore, prior to entering the invention the gases are cooled to a target temperature of 50° C. by conventional heat exchange device(s). Depending on the choice of heat exchangers employed, the cooled gas may or may not contain cooling fluid as a component of the flow.

The scrubbing tank is filled with scrubbing fluid to a preferred level 150 mm. above the top of the submerged scrubbing head. A scrubbing fluid level monitoring device maintains the fluid level at the desired level. The gas to be scrubbed is introduced to the scrubbing device through an inlet port located in the side, bottom or top of the scrubber tank. A temperature and pressure sensor may be located at this point to monitor the inlet conditions. In one embodiment, the gas travels in a pipe through a gas inlet duct to an inlet port located on the submerged head to permit even dispersion of the gas along a medial position of the lower side of the submerged head. The gas is bounded by the side walls of the submerged head and directed through the slots in the plate. The trapped gas is released through the slots in the submerged head, creating a highly agitated zone of bubbles above the slotted head. In the preferred case, the slots of the lower head are cut at an angle of 30 degrees from the vertical is such a manner to create a counter-clockwise flow of the turbulent gas mixture above the head. The gas then contacts the baffle located immediately after leaving the submerged head. The diffuser is shaped to divert the gas in a manner that allows the formation of a uniform and stable gas/fluid mixture above the head.

The gas/fluid mixture rises above the first head, and is trapped under the flooded head. The larger surface area of the second head permits greater slot area which is used to reduce the velocity of the gas passing through the slots of the flooded head. In the preferred case, the slots in the flooded head are cut at an angle of approximately 30 degrees to the vertical in a manner to impart a clockwise circulation in the turbulent zone above the scrubber head. The turbulent zone above the flooded head contains a second baffle to restrain the turbulent backlash of scrubbing fluid in this larger free area. The scrubbed gas is now free to rise slowly in the scrubber tank. The rising gas is subjected to an overhead spray of scrubbing fluid from a plurality of spray nozzles.

Rising past the spray heads, the gas remains at the 50° C. inlet temperature and is at 100% relative humidity. In addition, free water remaining from the turbulent mixing at the scrubber head is carried in the rising gas. This free water is removed as the gas passes through a mist eliminator containing an absorbent mesh pad in the upper region of the scrubber. The gas enters may enter an exhaust stack of a size to maintain the flow at a pace approximately 50% slower than its entry speed. The cool exiting gas is directed to an air to air heat exchanger where it interacts with the hot incoming air from the gas generating source. The reheated gas is exited from the heat exchanger into ambient air.

Figure 10:
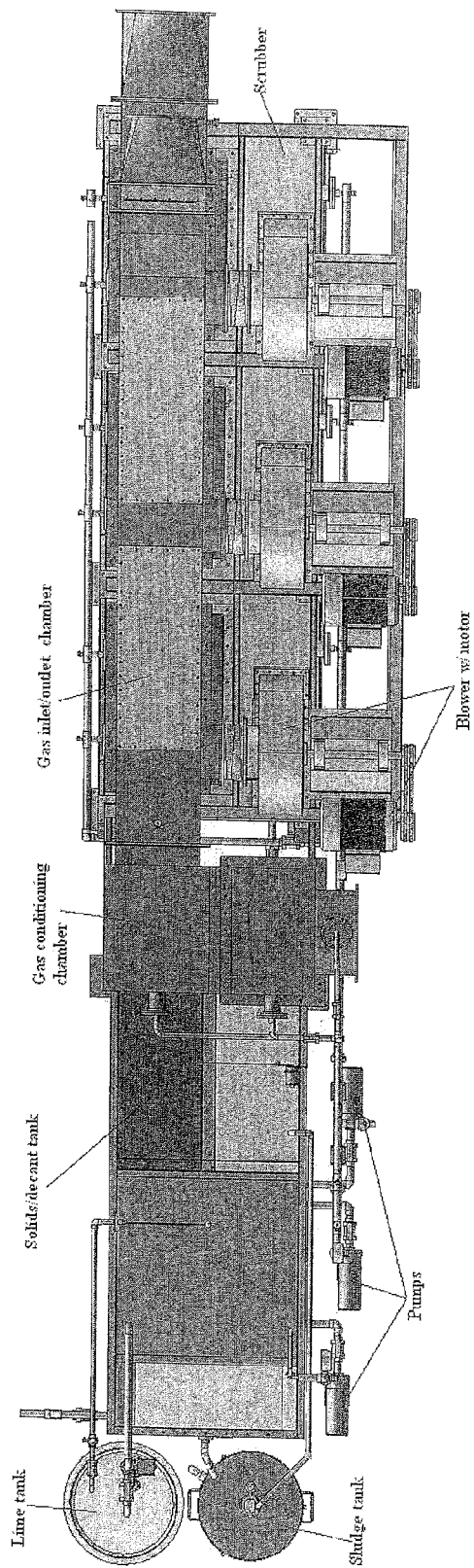
FIG. 10 is a top view of a gas scrubbing plant incorporating one embodiment of the scrubber of the present invention.

The scrubbing fluid is constantly circulated within a closed system. The fluid leaves through a drain in the bottom of the tank and enters a circulation pump. Leaving the pump the temperature and pH of the fluid are monitored enroute to one or more filtration devices to remove the particulate and precipitated salts of sulphur, carbon or other elements. Following the filtration process the fluid enters a heat exchanger where it is cooled. The fluid flow may be split at the exit of the heat exchanger with the bulk of the flow going to the inlet gas heat exchanger and the balance directed to the spray heads inside the scrubber tank. A flow rate is maintained so that the scrubbing fluid may be processed once each minute, in a preferred embodiment. One embodiment of a plant assembly comprising the scrubber of the present invention is depicted in FIG. 10.

For scrubbing sulphur dioxide, the scrubbing fluid consists of a lime solution which is stored in a separate tank. The storage tank has a circulation pump the constantly mix the lime in the solution. A separate pump feeds the scrubbing fluid into the scrubber system as required to make up fluid or to maintain the pH in its operating range. Lime in dry powdered form can be added manually or via auger from a hopper, depending on the operating conditions. For scrubbing oxides of nitrogen, ammonia may be used as a scrubbing fluid. Other material may be used to scrub carbon dioxide or other contaminants from the gas to be scrubbed.

From the foregoing, it will be seen that this invention is one well adapted to attain all of the ends and objectives herein set forth, together with other advantages which are obvious and which are inherent to the apparatus. It will be understood that certain features and sub-combinations are of utility and may be employed with reference to other features and sub-combinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense. It will be appreciated by those skilled in the art that other variations of the preferred embodiment may also be practiced without departing from the scope of the invention.

I claim:

1. A scrubber apparatus for removing contaminants from a gas stream, comprising:

a) a tank having a ceiling, a floor, a gas inlet, a gas outlet, a scrubbing fluid inlet at an upper end, and a scrubbing fluid outlet in the floor;
b) a submerged head extending horizontally between the four walls of the tank above the scrubbing fluid outlet and below the gas outlet, wherein the submerged head comprises a plate having a plurality of narrow slots extending throughout, four solid joined vertical walls inset from the walls of the tank and extending below the plate to form an open ended box under the plate, and a row of scrubbing fluid openings along each edge of the plate between the walls of the tank and the vertical walls of the submerged head;
c) a first baffle extending horizontally between the four walls of the tank and disposed above the submerged head and below the gas outlet; and
d) one or more spray means for spraying scrubbing fluid from an upper end of the tank.

2. The scrubber apparatus of claim 1, further comprising:
a) a first flooded head extending horizontally between the four walls of the tank above the first baffle and below the gas outlet, wherein the flooded head comprises a: plate having a plurality of narrow slots extending throughout;
b) a second baffle extending horizontally between the four walls of the tank and disposed above the first flooded head and below the gas outlet.

3. The scrubber apparatus of claim 2, further comprising:
a) a second flooded head extending horizontally between the four walls of the tank above the second baffle and below the gas outlet;
b) a third baffle extending horizontally between the four walls of the tank and disposed above the second flooded head and below the gas outlet.

4. The scrubber apparatus of claim 1, 2, or 3, wherein the gas inlet is located at the top end of the tank and a gas inlet duct conducts the gas to a position below the submerged head.

5. The scrubber apparatus of claim 1, 2, or 3, wherein the gas inlet is located at the side of the tank and a gas inlet duct conducts the gas to a position below the submerged head.

6. The scrubber apparatus of claim 1, 2, or 3, wherein the gas inlet is located below the submerged head of the tank.

7. The scrubber apparatus of claim 1, 2 or 3, further comprising an access door in one or more walls of the tank.

8. The scrubber apparatus of claim 1, 2 or 3, further comprising a mist eliminator having four vertical walls forming a hollow vertical column contiguous with the tank, wherein the mist eliminator comprises an absorbent mesh extending between the four walls of the mist eliminator.

9. The scrubber apparatus of claim 1, 2 or 3, further comprising an access door in one or more walls of the tank.

10. The scrubber apparatus of claim 1, 2, or 3, wherein the flooded head further comprises an overflow pipe disposed through the plate of the flooded head.

11. The scrubber apparatus of claim 1, 2 or 3, wherein the spray means comprises one or more spray nozzles positioned near the ceiling of the tank.

12. The scrubber apparatus of claim 1, 2 or 3, wherein the slots of the submerged head are cut at an angle of between 20 and 40 degrees from vertical.

13. The scrubber apparatus of claim 2 or 3, wherein the slots of the flooded head are cut at an angle of between 20 and 40 degrees from vertical.

14. The scrubber apparatus of claim 1, 2 or 3, wherein the spray means comprises one or more spray nozzles positioned near the ceiling of the tank.

15. The scrubber apparatus of claim 1, 2 or 3, wherein the size of the slots in the submerged head are selected to prevent passage therethrough of scrubbing fluid in the presence of gas below the submerged head unless the level of scrubbing fluid exceeds a selected height above the submerged head.

16. The scrubber apparatus of claim 1, 2 or 3, wherein the size of the slots in the flooded head are selected to prevent passage therethrough of scrubbing fluid in the presence of gas below the flooded head unless the level of scrubbing fluid exceeds a selected height above the flooded head.

\* \* \* \* \*